United States Patent

Foster et al.

[11] 4,027,919
[45] June 7, 1977

[54] WHEEL COVER

[75] Inventors: Edwin E. Foster; Thomas E. Foster, both of Austin, Tex.

[73] Assignee: Michael Ladney, Jr., Grosse Pointe Shores, Mich.

[22] Filed: May 22, 1975

[21] Appl. No.: 579,903

[52] U.S. Cl. .................. 301/37 TP; 301/37 P; 220/320

[51] Int. Cl.² ........................................ B60B 7/00

[58] Field of Search ......... 301/37 R, 37 ST, 37 TC, 301/37 P, 37 CM, 37 SS, 37 T, 37 C, 37 CD, 37 TP, 37 PB, 37 L, 108 R, 108 A; 24/73 HC; 29/159 A; 220/320; 292/256.6, 256.61, 256.65

[56] References Cited

UNITED STATES PATENTS

| | | | |
|---|---|---|---|
| 136,513 | 3/1873 | Hering | 301/108 R |
| 771,740 | 10/1904 | McKeel | 301/108 R |
| 1,845,323 | 2/1932 | Neuner | 301/108 R |
| 1,847,228 | 3/1932 | Smith | 220/320 |
| 1,953,634 | 4/1934 | Reichenbach | 301/108 R |
| 3,575,468 | 4/1971 | Kapanka | 301/37 R |
| 3,747,984 | 7/1973 | Andrews et al. | 301/37 P |

FOREIGN PATENTS OR APPLICATIONS

| | | | |
|---|---|---|---|
| 629,361 | 10/1961 | Canada | 301/37 R |

*Primary Examiner*—Stanley H. Tollberg
*Assistant Examiner*—H. Grant Skoggs
*Attorney, Agent, or Firm*—Barnes, Kisselle, Raisch & Choate

[57] ABSTRACT

A vehicle wheel cover formed of plastic or metal having a wire ring supported on the inboard face thereof. The ring is formed with a plurality of circumferentially spaced radially outwardly extending projections which are designed to forcibly engage an annular surface on the wheel to retain the cover thereon. The ring is supported on the cover such that the forces developed by displacing the projections radially inwardly as a result of mounting the cover on a wheel are substantially completely absorbed by the ring itself rather than being transmitted to the cover. Thus the cover itself is not subjected to any forces which tend to flex or distort it.

18 Claims, 26 Drawing Figures

WHEEL COVER

This invention relates to vehicle wheel covers.

One of the problems associated with wheel covers as presently constructed has to do with the inability to obtain secure and reliable retention of the cover on the wheel. This is particularly true of covers which, for economy, weight or other reasons, are of light construction. For example, wheel covers formed of plastic are capable of distorting quite readily, as are covers formed of very light gauge sheet metal, such as stainless steel or aluminum. The inability to obtain positive retention of such covers on a vehicle wheel over an extended period of time or when the wheel is subjected to abnormal road shocks is to a large extent attributable to the fact that the means for retaining the cover on the wheel normally comprises a plurality of radially flexible spring fingers mounted on the inboard face of the cover and designed to engage with an annular surface on the wheel rim. These spring fingers are stressed when the cover is applied to the wheel and the retention of the cover on the wheel depends upon the ability of the spring fingers to remain stressed. However, in conventional wheel covers the retention forces exerted by the spring fingers are transmitted to or resisted by the cover itself. Thus, unless the body portion of the wheel cover is sufficiently rigid to absorb such forces without flexing or deflecting, the retention forces are substantially reduced. In the case of plastic wheel covers the condition is aggravated by the fact that the application of such forces over a long period of time can result in permanent deformation of the cover, in which case the retention forces of the spring fingers are very substantially diminished. In any event, where the cover is of such construction that the retention forces tend to flex or distort the cover, the tension on the spring fingers is diminished and the cover may not be securely mounted on the wheel.

The present invention has for its primary object the elimination of the problem referred to above by mounting the wheel-engaging spring retention means on the cover in a manner such that the retention forces are substantially completely absorbed by the resilient retention means themselves rather than being transmitted to or resisted by the body of the wheel cover.

More specifically, it is an object of this invention to provide a wheel cover retention means in the form of a single or multiple section, resiliently flexible ring formed with a plurality of circumferentially spaced, radially outwardly extending wheel-engaging projections thereon. The ring is designed and mounted on the cover body such that substantially all of the forces resulting from flexing of the ring when the cover is mounted on the wheel are absorbed by the ring itself rather than being transmitted to the cover.

The aforementioned objects are achieved by forming the wheel-engaging projections on the ring as rigid radially extending members which, when the cover is applied to the wheel, act as rigid columns (not as flexible beams). The radially extending wheel-engaging projections are circumferentially interconnected by spring wire elements which, when the projections are displaced radially inwardly, act as unstable resilient columns. The ring is mounted on the inboard side of the cover by means which permit free radial movement of the wheel-engaging projections and which simultaneously permit free flexing of the interconnecting wire elements. Thus, the retention forces are transmitted directly to these interconnecting wire elements and cause the latter to flex as a result of endwise loading or compression. Covers according to the present invention operate in this manner because the wheel-engaging projections and the interconnecting sections of the wire ring all lie in a substantially single flat plane parallel to the plane of the wheel.

Other features and objects of the present invention will become apparent from the following description and accompanying drawings, in which.

In FIGS. 1 through 6 the wheel cover 10 illustrated therein includes a plastic molded body portion 12 having a wire ring 14 mounted on the inboard face thereof by means of a plurality of supports 16 molded integrally with body portion 12. The cover is adapted to be mounted on the rim 18 of a wheel 20 illustrated in FIG. 5. More specifically, the rim 18 is fashioned with a radially inwardly facing annular safety groove 22 spaced axially inwardly of the outer edge 24 of the rim. Cover 10 has an annular flange 26 around its outer periphery and a series of six supports or ring mounting means 16 which are in the form of axially extending lugs 28 located inwardly of flange 26 and spaced equally around the cover. The radially outer surfaces of lugs 28 define a circle which is of slightly less diameter than the portion of the rim adjacent and axially outwardly of safety groove 22. The axially inner ends of lugs 28 are formed with a flat face 30 and an axial extension 32.

Figures 1, 2, 3, 3A:
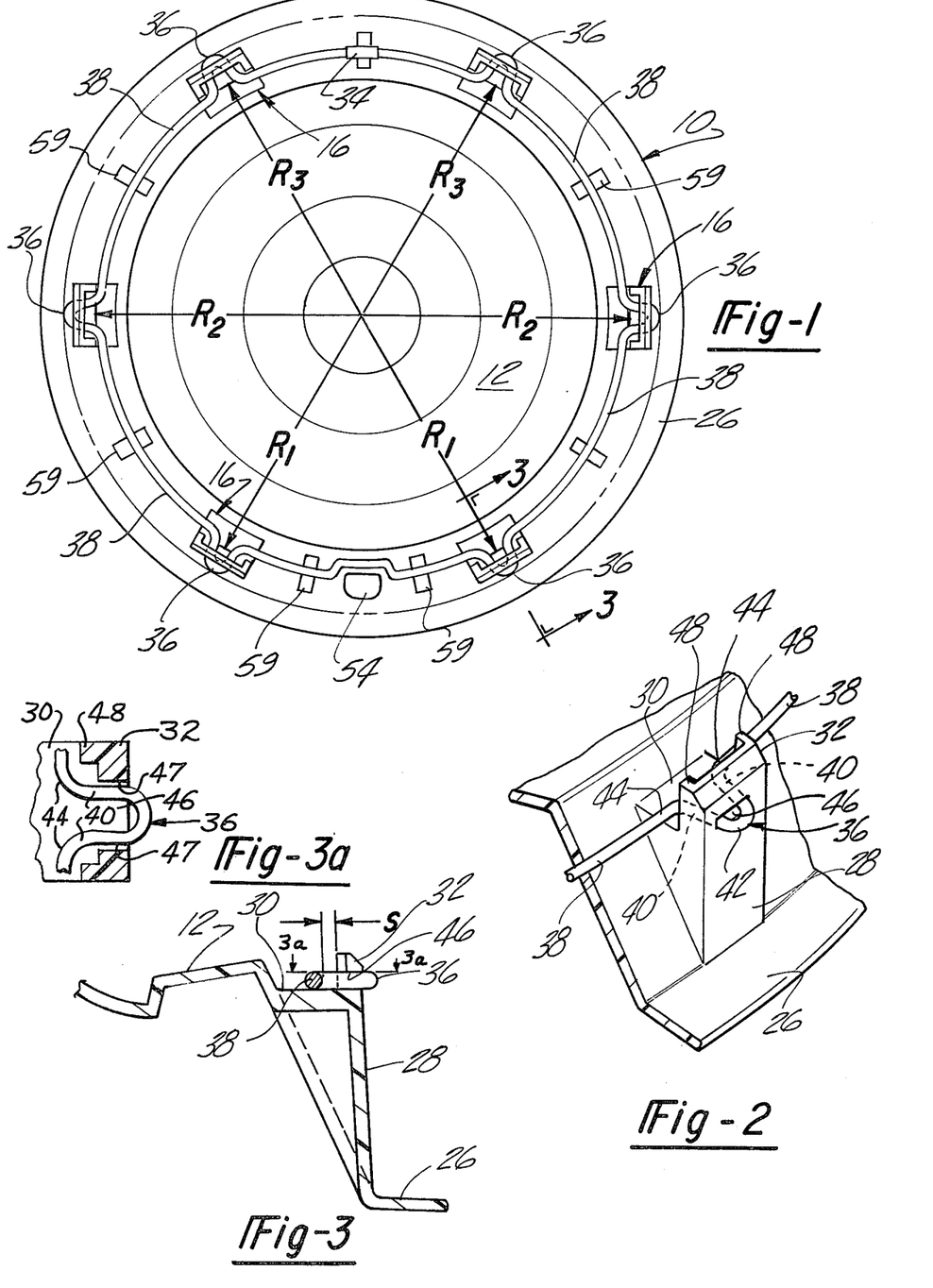
FIG. 1 is a plan view of the inboard face of a wheel cover according to the present invention.
FIG. 2 is a fragmentary perspective view of a portion of the wheel cover shown in FIG. 1.
FIG. 3 is a fragmentary sectional view along the line 3—3 in FIG. 1.
FIG. 3a is a fragmentary sectional view along the line 3a–3a in FIG. 3.

Ring 14 in the embodiment illustrated in FIGS. 1 through 6 comprises a single length of wire of circular cross section bent into circular shape and having its opposite ends secured together by a bushing 34. Ring 14 is formed with six radially outwardly extending loops or projections 36 which are interconnected by arcuate circumferentially extending spring sections 38. Each loop 36 consists of a pair of generally parallel, radially outwardly extending short legs 40 connected at their outer ends by means of a sharp return bend 42. Legs 40 extend generally radially of the cover and are connected to the spring elements 38 by relatively sharp bends 44. Ring 14 is arranged on the cover with loops 36 projecting outwardly through radial passageways 46 formed in lug extensions 32. Loops 36 have a relatively close fit with the walls 47 of passageways 46 which form guide surfaces for legs 40. The return bends 42 at the outer ends of loops 36 project slightly beyond the radially outer surfaces of lugs 28. The bends 44 connecting loops 36 and spring elements 38 are positioned axially against the flat faces 30 of lugs 28. It will be noted that lugs 28 are substantially wider than loops 36 and are formed with a pair of spaced shoulders 48 which are adapted to engage the spring elements 38 directly adjacent bends 44. When ring 14 is assembled with the cover as shown in FIG. 1, it is in an unstressed condition and shoulders 48 are spaced slightly radially outwardly of the ends of the arcuate spring elements 38. In FIGS. 1 through 3a this radial spacing (designated s) is shown exaggerated. In practice this radial spacing is preferably on the order of 0.010 to 0.020 inch. Likewise, it will be appreciated that vehicle wheels for a particular size tire vary slightly in diameter within predetermined tolerances. The circle defined by the radially outer ends of loops 36 is at least slightly greater than the maximum diameter of the safety groove 22 of the size of wheel for which the cover is designed.

Figure 5:
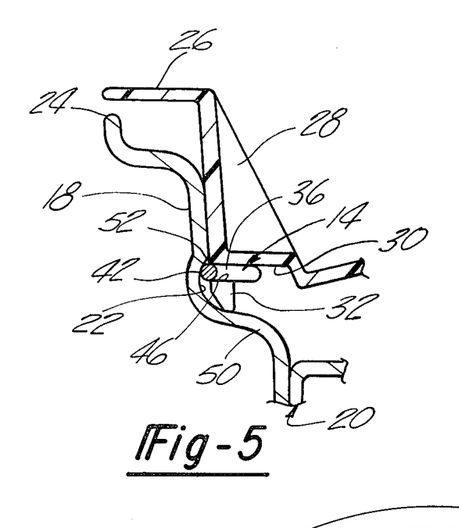
FIG. 5 is a fragmentary sectional view illustrating the manner in which the cover retention means engage the rim of a vehicle wheel to retain the cover on the wheel.
Figure 6:
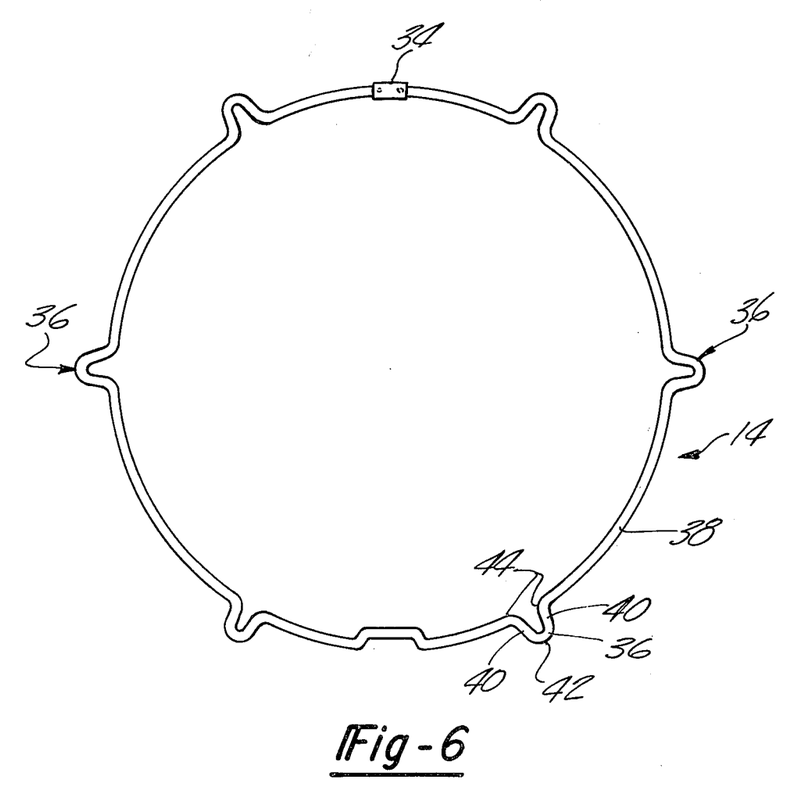
FIG. 6 is a plan view of the spring retention ring illustrated on the cover shown in FIGS. 1 through 5.

The axially inner ends of lug extensions 32 are spaced axially from flange 26 so that they will engage the shoulder 50 on the wheel rim adjacent safety groove 22 so that, when the cover is mounted on the wheel, flange 26 will be spaced slightly from and outwardly of the edge 24 of the rim as shown in FIG. 5. Likewise, the flat surface 30 on lug 28 is located so that ring 14 lies in the plane of safety groove 22 and, more specifically, adjacent the axially outer shoulder 52 of safety groove 22 as illustrated in FIG. 5.

Figure 4:
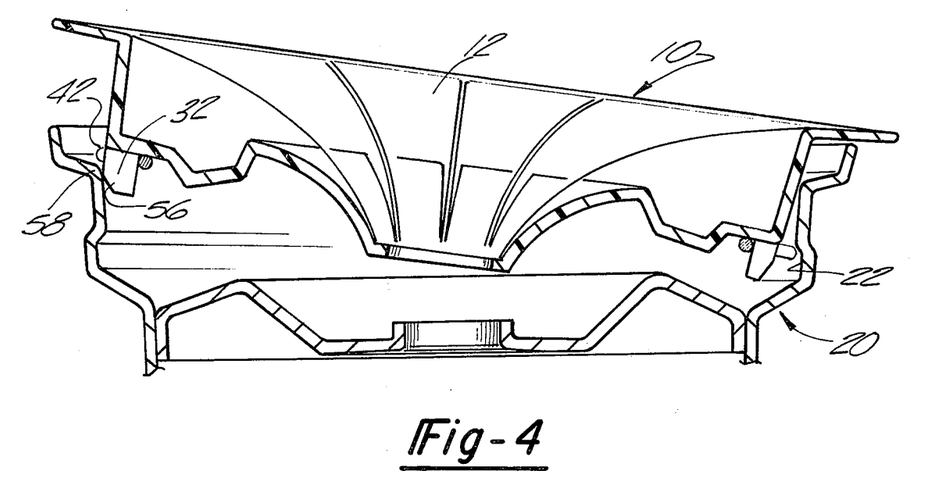
FIG. 4 is a sectional view showing the method of mounting the wheel cover illustrated in FIG. 1 on a vehicle wheel.

Since, as indicated above, the circle defined by the outer ends of loops 36 has a diameter slightly greater than the diameter of safety groove 22, it is apparent that in order to position the cover on the wheel in the manner illustrated in FIG. 5 it is essential to displace each of the loops 36 radially inwardly. This is accomplished in the manner illustrated in FIG. 4. The cover 10 is placed against the outboard face of wheel 20 with the valve stem on the wheel projecting through the valve stem opening 54. The cover is inclined to the face of the wheel as shown in FIG. 4 so that the two lugs next adjacent the opposite sides of opening 54 extend into the wheel a further extent than the remaining lugs and the outer ends 42 of the adjacent loops 36 project at least slightly into the adjacent portion of the safety groove 22 on the wheel rim. Thereafter the portion of the cover diametrically opposite valve stem opening 54 is pushed inwardly against the outer face of the wheel. The beveled ends 56 of lug extensions 32 assist in directing the cover inwardly against the face of the wheel. Eventually the outer ends 42 of loops 36 on the outwardly inclined portion of the cover engage the rounded shoulder 58 on the rim to urge these loops 36 radially inwardly and, thus, allow the cover to be displaced from the inclined position shown in FIG. 4 to the mounted position shown in FIG. 5. In FIG. 5 it will be observed that the outer ends 42 of loops 36 are engaged in the safety groove 22 adjacent shoulder 52 of the latter.

It will be observed that loops 36 are relatively short and the legs 40 thereof extend generally radially. Thus, when these loops are displaced radially inwardly by forcing the cover on the rim as described, they act as rigid columns and do not flex substantially. However, as loops 36 are displaced radially inwardly, the chordal distance between the successive loops becomes shorter and thus the opposite ends of the arcuate spring elements 38 are subjected to compressive forces. The spring elements 38 thus act as unstable columns and, when subjected to end compression forces as described, they flex radially outwardly. It will be observed that the lugs 28 and their extensions 32 restrict movement of loops 36 only in an axial and circumferential direction; the lug extensions 32 do not restrict radial movement of loops 36. At the same time it will be noted that the flexing of spring elements 38 which connect successive loops 36 is in no way restricted by the cover or by lugs 28. Thus, the forces generated by the radial inward movement of loops 36 in passageways 46 are completely absorbed by the interconnecting spring elements 38 and none of these forces is transmitted to the cover itself. It follows that the magnitude of the retention forces exerted between the cover and the wheel depend upon the extent to which loops 36 are displaced inwardly from their free position when they are engaged with safety groove 22. In neither the free position nor in the tensioned position of loops 36 are forces applied to the cover itself. Thus, regardless of whether the cover is made of plastic or light-weight sheet metal, no distortion of the cover will occur. This is true both when the cover is mounted on the wheel and also before it is applied to the wheel.

As pointed out previously, it will be appreciated that the diameter of the circle formed by the outer ends of loops 36 must be at least slightly greater than the diameter of the safety groove 22 or other annular surface of the largest size wheel for which the cover is designed and with which the loops 36 are intended to engage. At the same time, it is obviously necessary that the circle formed by the outer peripheral surfaces of lug extensions 32 must be at least slightly smaller than the inner diameter of the smallest wheel for which the cover is designed. However, it is apparent that, even though ring 14 is designed to firmly interengage with a wheel having dimensions which are at the high limit of the tolerance, it is essential that the cover be adapted to be readily applied to a wheel having dimensions which are at the low limit of the tolerance. Accordingly, in the case of wheels the dimensions of which are at the low limit of the tolerance it may be necessary to displace the loops 36 radially inwardly a considerable extent. This could pose a problem with respect to the operation of applying the cover to the wheel. With the cover of the present invention this problem is minimized by providing different clearances s between the bends 44 and shoulders 48 on the various lugs 28. For example, as shown in FIG. 1 the radial distance $R_1$ is greater than the radial distances $R_2$ and $R_3$. Likewise, the distance $R_2$ is greater than the distance $R_3$. Thus, with respect to the two lugs directly adjacent valve stem opening 54, the clearance s (FIG. 3) is greater than the corresponding clearance at the two diametrically opposite lugs and this clearance at the two intermediate lugs is of an intermediate value. Thus, in applying the cover to a wheel the opening 54 is first inserted over the valve stem so that the cover assumes the position illustrated in FIG. 4 and the two loops 36 adjacent the valve stem opening will be aligned with the safety groove 22. At the diametrically opposite side of the cover where it is inclined outwardly from the plane of the wheel, the beveled portions 56 of the lug extensions 32 will engage the shoulder 58 on the rim. However, since the clearance space s at these latter lugs is relatively small, as the latter lugs are cammed axially into the wheel and radially inwardly they will engage the adjacent bends 44 and actually compress the ring so that the loops 36 at these lugs can be inserted into safety groove 22 without too much effort while still obtaining a very substantially retention force between the ring and the wheel. It will be appreciated that, although the clearance space s may be substantially greater at the two lugs adjacent valve stem opening 54 than at the other lugs, this fact will not permit radial excursion of the cover relative to the ring. This follows because the legs 40 have only a slight clearance, for example, about 0.005 inch, with the side walls 47 of passageways 46. This relatively close fit between each of the loops 36 and its passageway 46 in the lug extension 32 prevents the ring as a whole from any substantial movement radially or circumferentially of the cover.

To remove the cover from the wheel it is only necessary to insert a prying tool between the edge of the cover and the edge of the rim. The tool is preferably inserted directly adjacent one of the lugs 28 where the body portion 12 of the cover is axially reinforced. However if the removal tool is inserted intermediate a pair of successive lugs 28 under one of the spring elements 38, the removal force is transmitted to the body portion of the cover by the additional lugs 59 molded integrally with the cover and underlying the central section of spring elements 38.

Figures 7, 9:
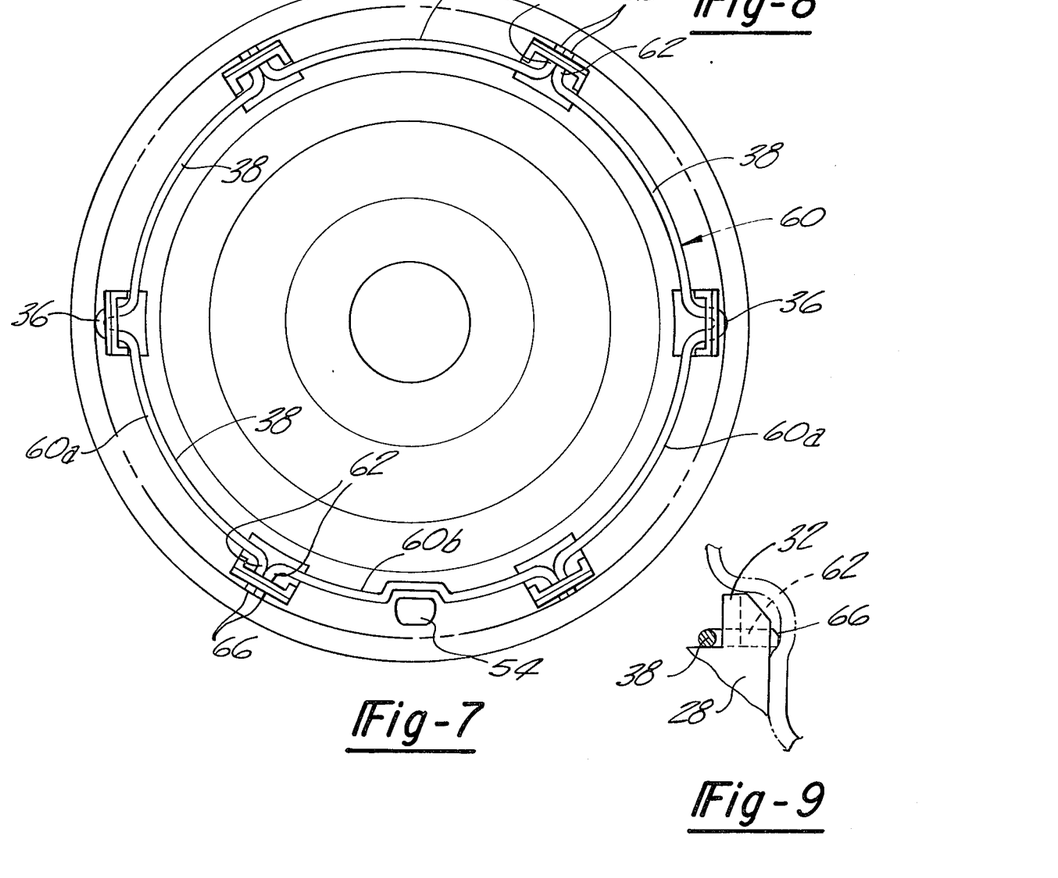
FIG. 7 is a plan view of the inboard face of a wheel cover having a modified form of retention means according to the present invention.
FIG. 9 is a fragmentary view showing the manner in which the cover shown in FIGS. 7 and 8 is retained on a vehicle wheel.
Figure 8:
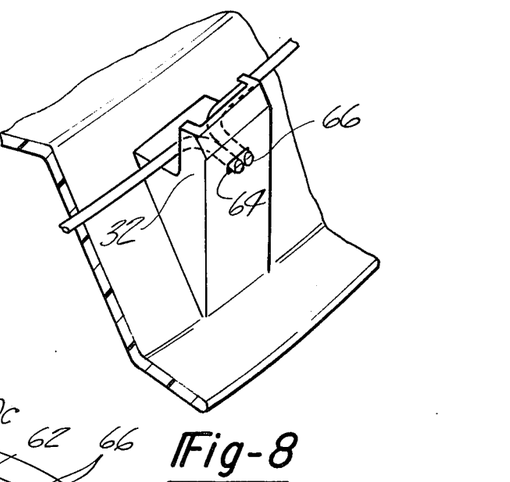
FIG. 8 is a fragmentary perspective view of a portion of the cover illustrated in FIG. 7.

The wheel cover shown in FIGS. 7 through 9 differs from that previously described primarily in that the retention ring 60 is formed of four individual sections, two identical sections 60a, a third section 60b adjacent valve stem opening 54, and a fourth section 60c diametrically opposite section 60b. Each of these four circumferentially extending sections have their ends 62 bent radially outwardly and in circumferentially abutting relation. The two sections 60a have loops 36 at the central portion thereof as described in connection with the previous embodiment. The outwardly bent ends 62 extend through and have a close fit with passageways 64 in lug extensions 32 so that the extreme outer ends thereof project radially outwardly beyond the outer peripheral faces of lug extensions 32. These ends, designated 66, are preferably provided with sharp edges which tend to prevent radial and axial movement of the cover relative to the wheel.

The outwardly bent ends 62 behave in substantially the same manner as the loops 36. As the ends are displaced radially inwardly they act as rigid stable columns and apply opposed circumferentially directed compressive forces to the opposite ends of the intermediate wire sections 38 which causes the latter to flex radially outwardly. These wire sections 38 act as unstable columns in compression as previously described and absorb substantially the entire load without transferring any substantial forces to the cover itself.

Figures 10, 11:
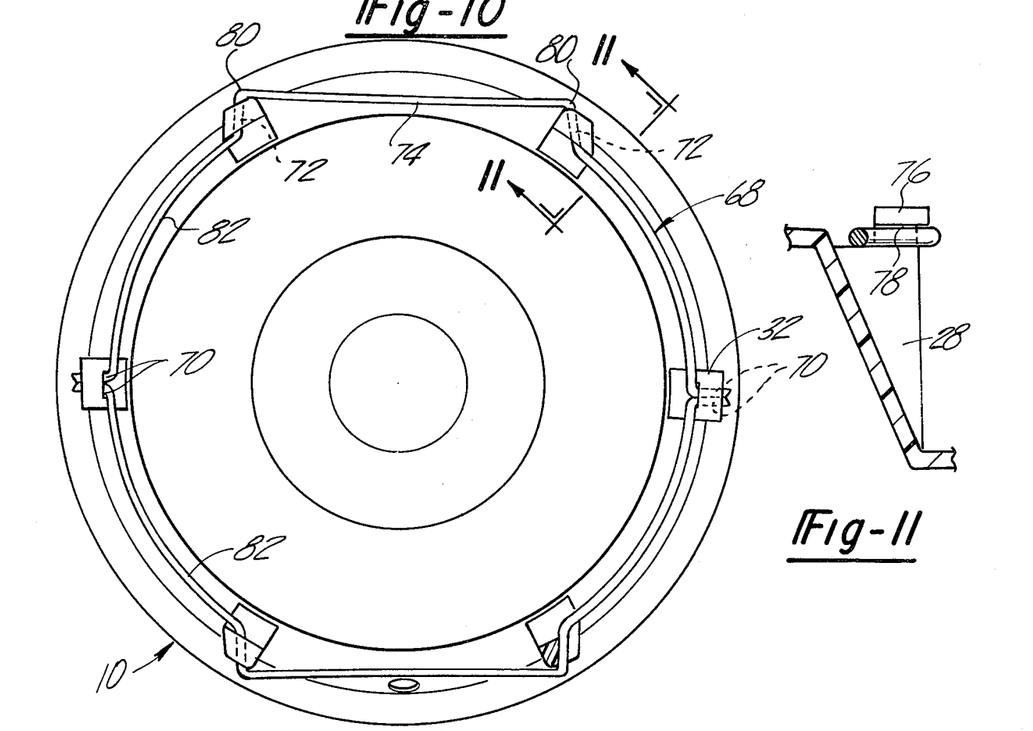
FIG. 10 is a plan view, with parts broken away, of the inboard face of a further modified form of wheel cover according to the present invention.
FIG. 11 is a fragmentary sectional view along the line 11—11 in FIG. 10.

In the wheel cover construction shown in FIGS. 10 and 11 the wire ring 68 is formed from two identical half sections, the ends of which are turned radially outwardly as at 70 and serve the same function and operate in substantially the same manner as the outwardly bent ends 62 in the embodiment illustrated in FIGS. 7 through 9. The outwardly bent ends 70 are retained in circumferentially abutting relation within the passageways 64 of the lug extensions 32. Intermediate the ends each of the two half sections is provided with a pair of generally parallel radially outwardly extending portions 72 which are interconnected by a generally straight leg 74. The lugs 28 on which the outwardly bent portions 72 are supported are formed with axial extensions 76. Extensions 76 are slotted as at 78 to receive and axially retain the bent sections 72 in the manner illustrated in FIGS. 10 and 11. The sharp bends 80 between the portions 76 and the straight leg 74 lie on a circle defined by the ends of the radially outwardly bent portions 70. Accordingly, when the cover shown in FIGS. 10 and 11 is mounted on a wheel, each of the bends 80 shift inwardly as do the bent ends 70 of the ring. The arcuate intermediate portions 82 flex radially outwardly by reason of the compression forces applied to the opposite ends thereof while the legs 74 remain substantially straight. In any event, the overall arrangement shown in FIGS. 10 and 11 produces substantially the same results as the previous embodiments described in that the retention forces are absorbed substantially completely by ring 68 and substantially no forces are transmitted to or absorbed by the wheel cover itself.

Figures 12, 13:
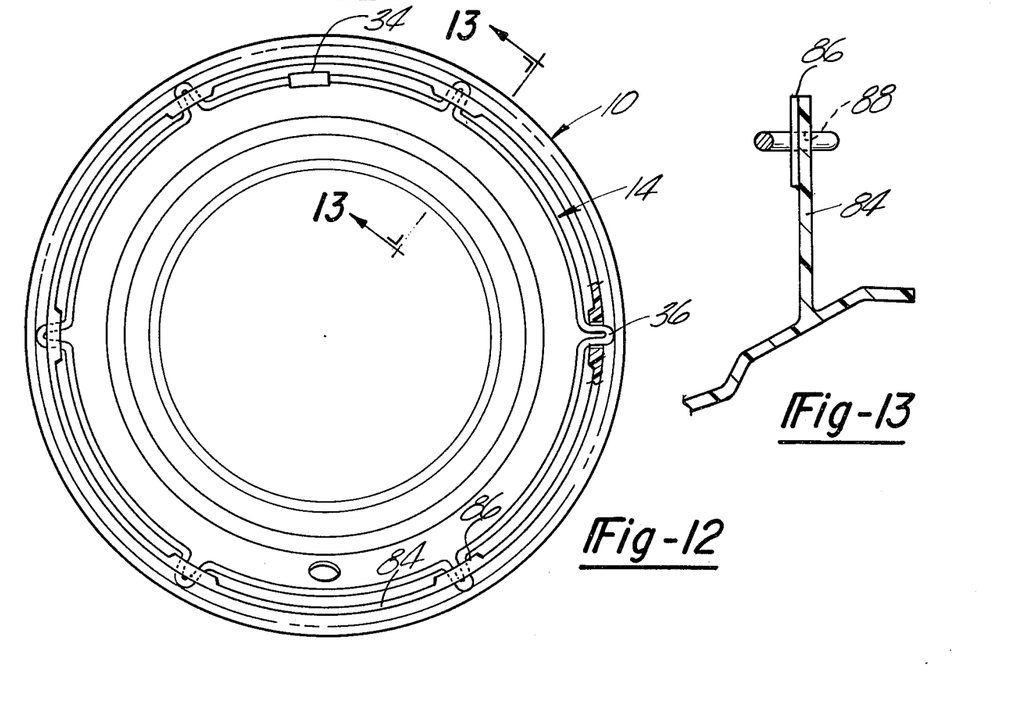
FIG. 12 is a plan view, with parts broken away, of the inboard face of a further embodiment of wheel cover according to the present invention.
FIG. 13 is a sectional view along the line 13—13 in FIG. 12.

In the wheel cover shown in FIGS. 12 and 13 the spring ring 14 is substantially the same as the spring ring shown in FIGS. 1 through 6. The ring is supported on the cover body itself by means of a circumferential flange 84 which extends axially from the inboard side of the cover. At six equally spaced points flange 84 is reinforced slightly, as by pads 86. The flange is apertured as at 88 to accommodate each of the loops 36. Apertures 88 confine ring 14 in a direction axially of the wheel and have only a slight clearance with the legs of loops 36 so as to prevent any substantial circumferential excursion of ring 14 relative to the cover. In other respects the assembly shown in FIGS. 12 and 13 operates substantially the same as that shown in FIGS. 1 through 6.

Figure 14:
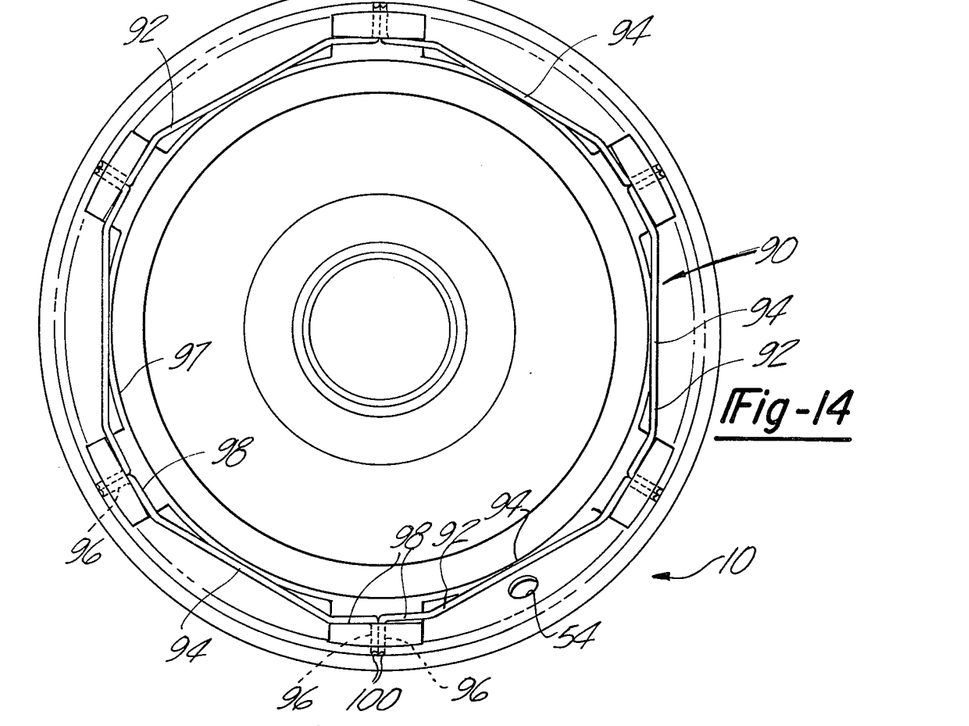
FIG. 14 shows a further embodiment of a wheel cover according to the present invention.
Figure 15:
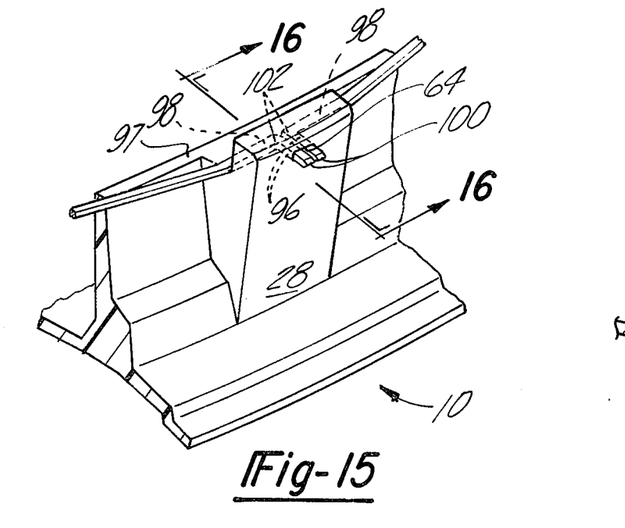
FIG. 15 is a fragmentary perspective view of the wheel cover shown in FIG. 14.
Figure 16:
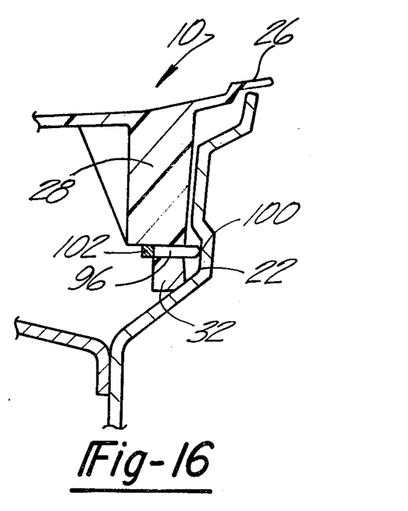
FIG. 16 is a sectional view along the line 16—16 in FIG. 15.

In the wheel cover assembly shown in FIGS. 14 through 16 the spring ring 90 is comprised of six identically shaped wire sections 92 of square cross section. Each section 92 has a straight central section 94 and radially outwardly bent legs 96 at the opposite ends thereof connected with the straight central section 94 by short sections 98 which are bent at substantially right angles to the outwardly bent ends 96. The central portion of sections 94 underlie and are axially supported by the circular rib 97 on the inboard face of the cover. The outwardly bent ends 96 are retained in apertures 64 in lug extensions 32 in substantially the same manner as illustrated in FIGS. 1 through 6. However, the lug extensions 32 in the arrangement shown in FIGS. 14 through 16 need not be formed with the shoulders 48 since the short sections 98 are straight rather than curved. As is true of the flexible rings previously disclosed, ring 90 is dimensioned such as to retain a cover on a wheel of a nominal size, the dimensions of which are at the high side of the tolerance. In the free condition the sections 92 are substantially unstressed and the outwardly bent ends 96 are merely in circumferentially abutting relation within the passageways 64 in the lug extensions 32. However, when the cover is applied to a wheel to interengage the sharp beveled free ends 100 with the safety groove 22 on the wheel, the outwardly bent legs 96 are displaced radially inwardly to place the sections 92 in endwise compression. Since the short sections 98 are at substantially right angles to the ends 96 the straight sections 94 flex radially between the bends 102. With this arrangement it will be appreciated that with a wire of particular size, whether of rectangular or circular cross section, the amount of retention force obtainable can be increased or decreased by shortening or lengthening the sections 94 in relation to the sections 98. The sharp beveled edges 100 engage the wheel rim to present both axial movement and rotation of the cover relative to the wheel.

The ring 90 illustrated in FIGS. 14 through 16 possesses several distinct advantages. Its rectangular cross section makes it stronger than an equivalent size wire of circular cross section. It is made up of six short wire segments of identical configurations. They can be formed very economically with the straight sections 94, 96, 98. The central section 94 avoids interference with the valve stem opening 54 in the cover. The segments can be assembled with the cover very readily. In assembly one of the legs 96 of each section 92 is inserted through passageway 64 in the lug extension 32 and, thereafter, the central wire section 94 is flexed manually or otherwise to insert the leg 96 at the opposite end into the passageway 64 in the next adjacent lug extension 32.

Figures 17, 18, 19:
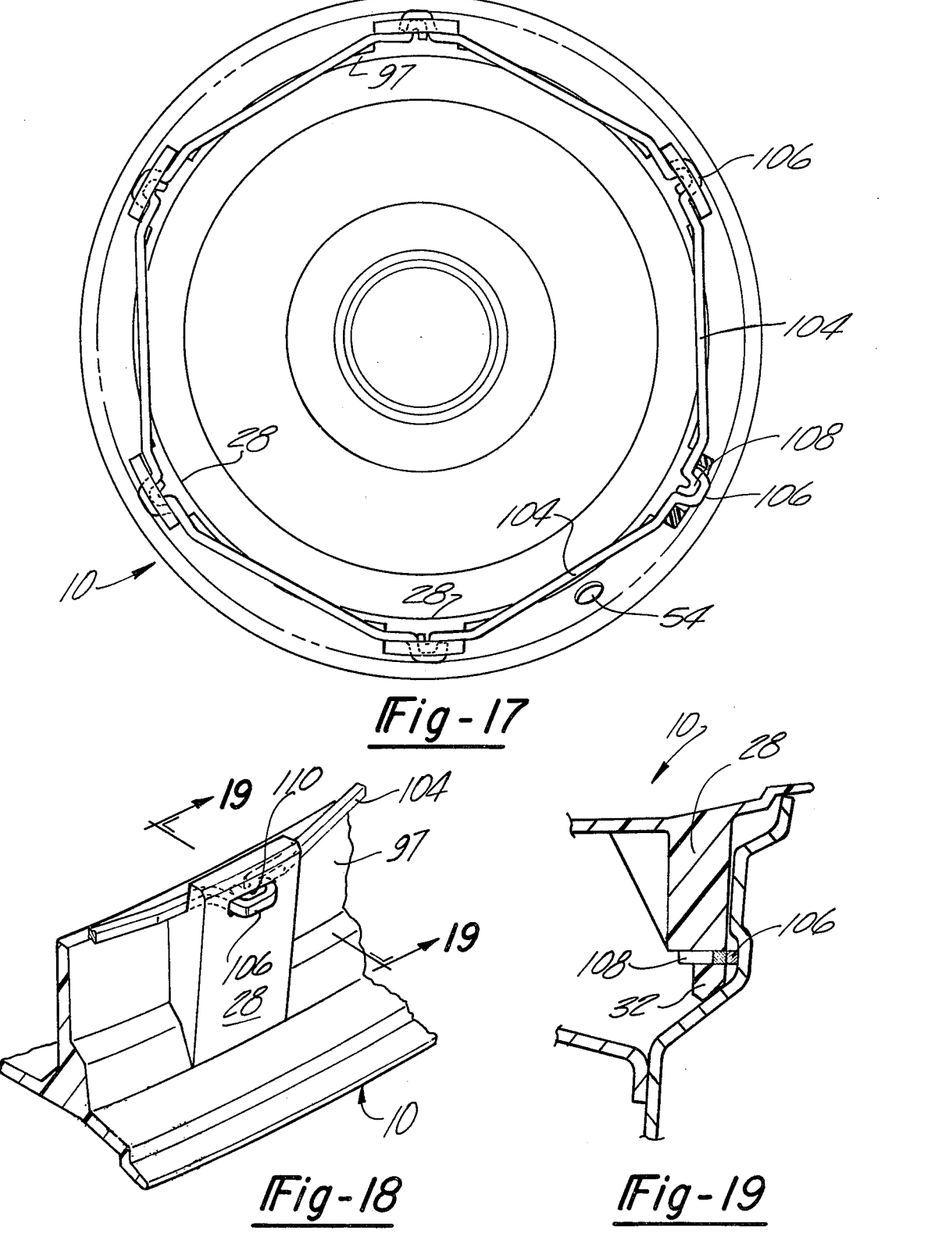
FIG. 17 is a plan view of the inboard face of a further modification of wheel cover according to the present invention.
FIG. 18 is a fragmentary perspective view of the cover shown in FIG. 17.
FIG. 19 is a sectional view along the line 19—19 in FIG. 18 and showing the cover mounted on a wheel.

The wheel cover construction shown in FIGS. 17 through 19 is similar to that illustrated in FIGS. 14 through 16. The difference resides primarily in the fact that each wire section 104 is formed with a large U-shaped loop 106 at one end and a smaller U-shaped loop 108 at its opposite end. Loops 106, 108 are shaped and dimensioned so that they are adapted to nest one within the other. The supports 28 have a radial passageway 110 extending therethrough to accommodate the wider loop 106. Loops 106, 108 are formed such that when they are assembled in a nested position as illustrated within passageway 110, the side edges thereof are in circumferentially abutting relation and retain the wire sections 104 assembled with the cover so that they behave in the manner of a circumferentially continuous ring. In the assembled condition of wire sections 104 the larger looped ends 106 do not transmit any force to the supports 28. These ends 106 when displaced radially inwardly merely cause the central portions of wire sections 104 to bow radially outwardly and thereby absorb the force resulting from the foreshortening of the chordal distance between the looped ends of the successive wire sections. Thus, the embodiment illustrated in FIGS. 17 through 19 operates in substantially the same manner as described with reference to FIGS. 14 through 16.

Figure 20:
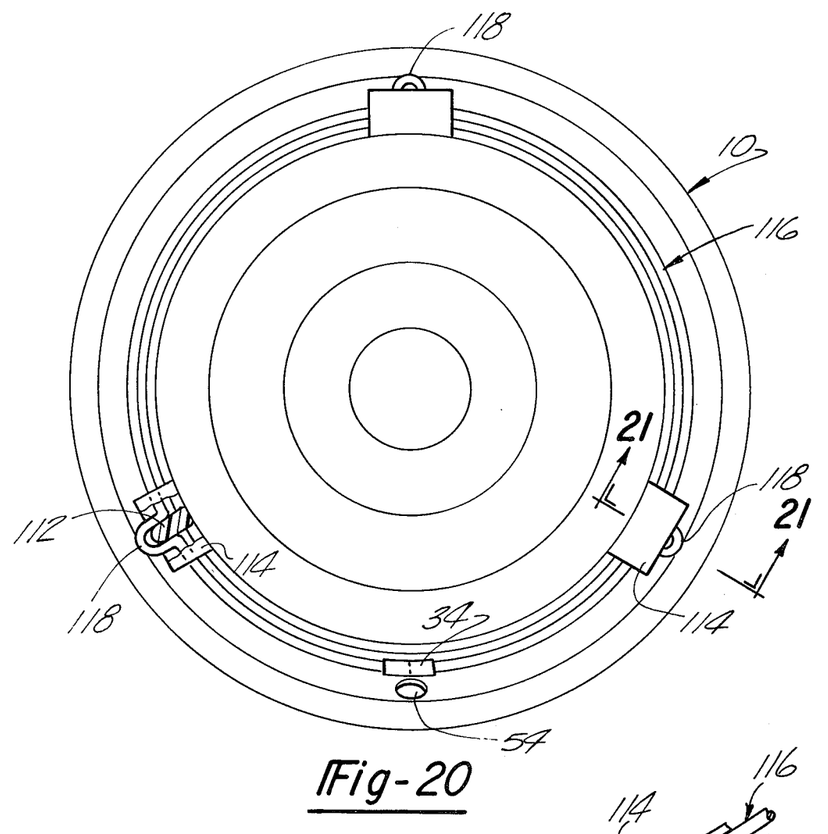
FIG. 20 is a plan view of the inboard face of another modification of wheel cover according to the present invention.
Figure 21:
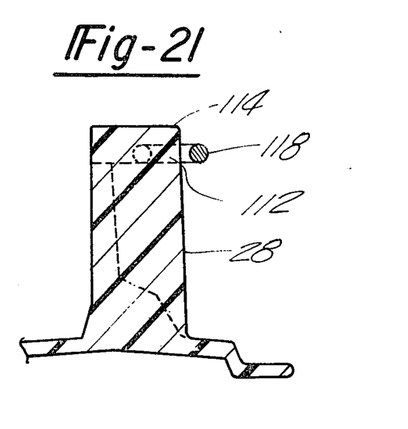
FIG. 21 is a sectional view along the line 21—21 in FIG. 20.
Figure 22:
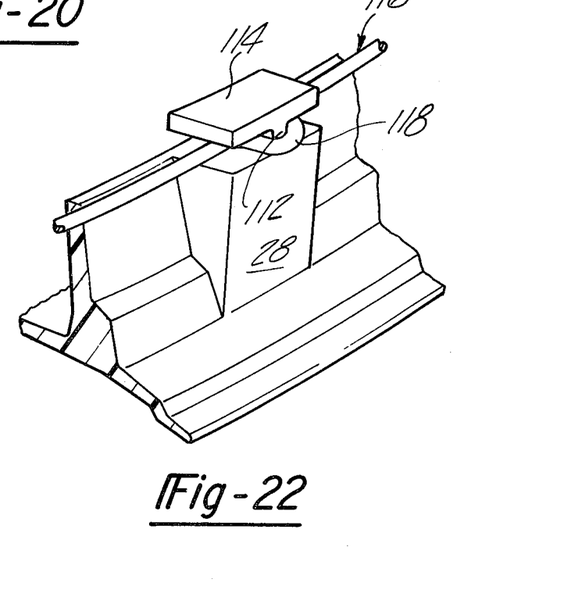
FIG. 22 is a fragmentary perspective view of the cover shown in FIG. 20.

In the embodiment illustrated in FIGS. 20 through 22 the supports 28 are fashioned with an axial extension in the form of a rib 112 having a wide flange 114 at the axially inner end thereof. The wire ring 116 shown in FIGS. 20 through 22 is generally of the same construction as the wire ring 14 illustrated in FIG. 6. However, ring 116 is formed with only three loops 118 rather than six loops. The legs of these loops straddle rib 112 in the manner illustrated in FIG. 20 to prevent relative rotation of ring 116 and cover 10 while permitting the loops to be displaced radially inwardly from their free position without transmitting any forces to the cover itself. In this arrangement ribs 112 not only serve as radial guides for loops 118, but also limit the extent of radial inward movement of the loops. Loops 118 are, of course, displaced radially inwardly when the cover is mounted on a vehicle wheel and the portions of ring 116 between loops 118 are flexed radially outwardly to absorb the retention forces without transmitting the same to the cover.

Figures 23, 24, 25:
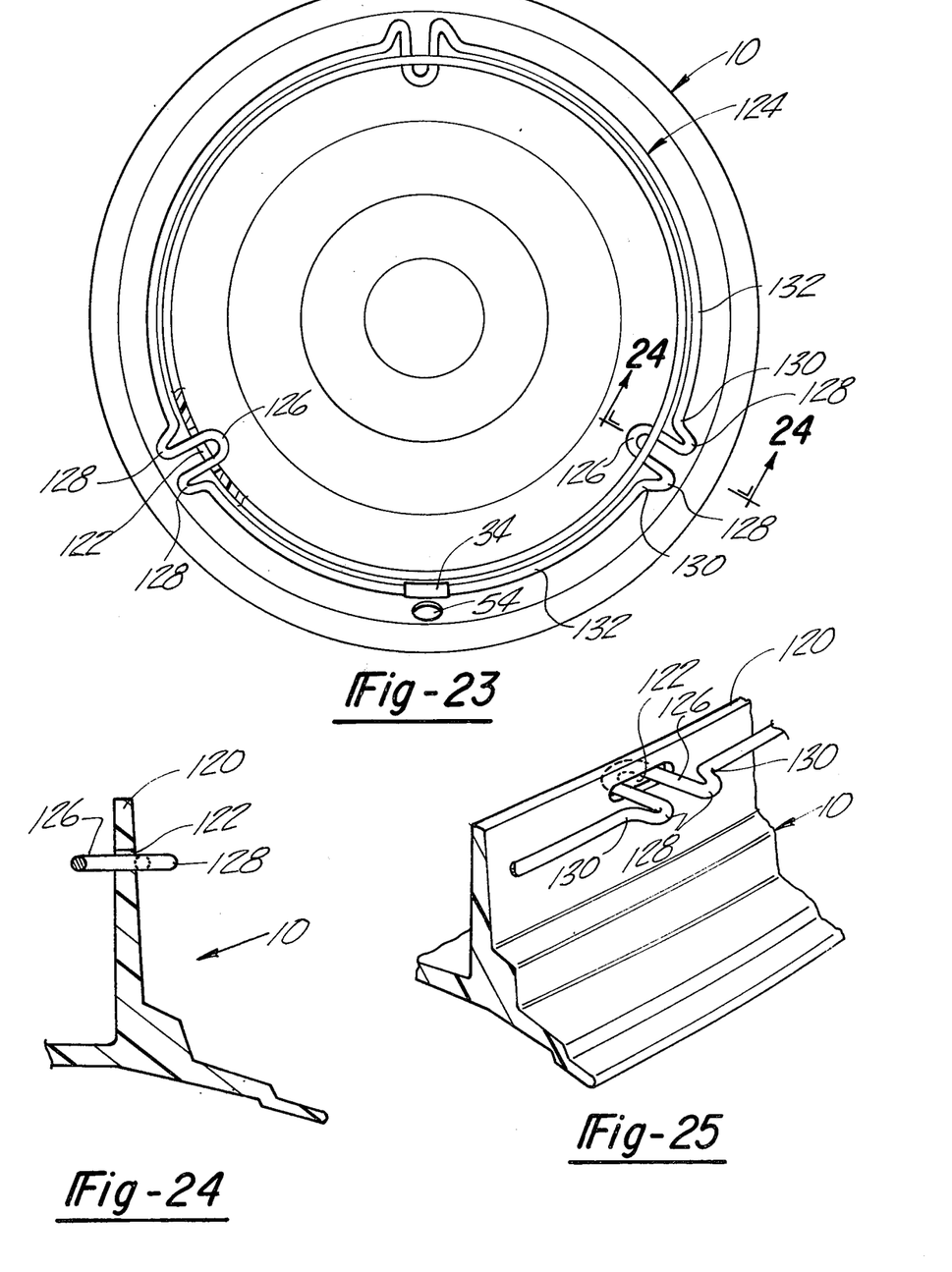
FIG. 23 is a plan view of the inboard face of another modification of wheel cover accordingly to the present invention.
FIG. 24 is a sectional view along the line 24—24 in FIG. 23.
FIG. 25 is a fragmentary perspective view of the cover shown in FIG. 23.

The cover construction shown in FIGS. 23 through 25 is somewhat similar to that illustrated in FIGS. 12 and 13. The cover 10 is provided with an axially extending circumferential flange 120 formed with radially extending apertures 122 therethrough. The wire ring 124 is fashioned with three radially inwardly extending loops 126. Ring 124 extends around the outside of flange 120 with loops 126 extending radially inwardly through apertures 122. The outer ends of the legs of loops 126 are return bent as at 128 and then connected by a bend 130 with the radially bowed portions 132 of the wire ring. The legs of loops 126 have a rather close fit with apertures 122 to prevent relative rotation between wire ring 124 and cover 10. However, as is the case with the previous embodiments described, loops 126 are free to shift radially in apertures 122. In this arrangement the return bends 128 form the wheel-engaging projections on ring 124. Depending upon the radial dimension of loops 126, the legs thereof may flex inwardly slightly towards one another when the cover is applied to a vehicle wheel. In other respects the construction shown in FIGS. 23 through 25 operates in substantially the same manner as the embodiments previously described.

It will be appreciated that although plastic wheel covers are shown and described, the invention is applicable to wheel covers formed of metal or a combination of metal and plastic.

We claim:
1. A wheel cover adapted for application to the outboard face of a vehicle wheel of the type having a radi- ally inwardly facing annular surface concentric with the wheel axis and with which the wheel cover is adapted to frictionally engage to retain the cover on the wheel, said cover having an annular portion which, when the cover is applied to the wheel, overlies said annular surface of the wheel, a spring wire ring mounted on the inboard face of the cover concentric with said annular portion, said ring lying in a generally flat plane perpendicular to the central axis of said annular portion of the cover, said wire ring having a plurality of at least three radially outwardly extending projections thereon adapted to engage said annular surface when the cover is applied to the wheel, said projections being spaced apart circumferentially around said ring and being connected by portions of the ring extending circumferentially between the projections, the outer ends of said projections defining a circle having a diameter at least slightly greater than the diameter of said annular surface of the wheel when the ring is in the unstressed condition, said projections having generally parallel side edge portions extending generally radially of the ring in the plane thereof, said projections being relatively rigid in a radial direction and acting as rigid columns when radially inwardly directed forces are applied to the radially outer ends thereof, said circumferentially extending portions of said ring being resiliently flexible radially in the plane of the ring in response to radial displacement of said projections, a plurality of ring mounting means on the inboard face of the cover spaced apart circumferentially to correspond with the circumferential spacing of said projections, each of said mounting means having a pair of radially extending guide surfaces thereon spaced apart to engage said side edge portions of said projections with a close sliding fit for preventing relative circumferential and axial movement between the ring and the cover, said close sliding fit also preventing radial displacement of the ring as a whole relative to the cover while permitting free radial inward movement of the projections relative to the cover, said circumferentially extending portions of said ring between said projections being relatively free of the cover in a radial direction to permit flexing thereof in the plane of the ring without transmitting forces to the cover when the projections are displaced radially inwardly.

2. A wheel cover as called for in claim 1 wherein said ring comprises a plurality of circumferentially successive segments having radially outwardly bent opposite ends, said ends being in circumferentially abutting relation and defining at least some of said projections, said mounting means engaging and retaining said bent ends in circumferentially abutting relation.

3. A wheel cover as called for in claim 2 wherein the adjacent ends of successive segments comprise a pair of loop sections nested one within the other.

4. A wheel cover as called for in claim 3 wherein each of said projections is defined by a pair of said radially outwardly bent ends whereby the number of segments corresponds to the number of said projections.

5. A wheel cover as called for in claim 4 wherein said projections are spaced equally around said ring.

6. A wheel cover as called for in claim 5 wherein all of said segments are of substantially the same configuration.

7. A wheel cover as called for in claim 1 wherein said flexible connecting portions of said ring are radially bowed between the inner ends of said projections.

8. A wheel cover as called for in claim 7 wherein said bowed portions comprise a generally straight central section and two generally straight end sections which are inclined radially inwardly from the opposite ends of said central section to the inner end of the adjacent projections, said end sections extending generally perpendicular to the adjacent projections.

9. A wheel cover as called for in claim 8 wherein said central section has a length equal to at least about twice the length of each of said end sections.

10. A wheel cover as called for in claim 1 wherein the outer extremity of each projection defines a wheel-engaging biting edge which, when engaged with said annular surface of the wheel, tends to prevent relative rotation between the cover and the wheel.

11. A wheel cover as called for in claim 1 wherein said mounting means comprises a plurality of axially extending supports on the inboard face of the cover, said projections extending radially outwardly beyond the radially outer faces of said supports.

12. A wheel cover as called for in claim 11 wherein the free end portions of the axially extending supports are beveled axially toward the cover in a radially outward direction.

13. A wheel cover as called for in claim 1 wherein said mounting means comprise a plurality of supports fixedly mounted on said cover, said supports having radially inwardly facing shoulder portions which, in the unstressed condition of said ring, are disposed radially adjacent the portions of said ring which are circumferentially contiguous to said projections and prevent substantial radial outward displacement of any of said projections when a radially inward force is applied to others of said projections.

14. A wheel cover as called for in claim 1 wherein at least some of said projections comprise a pair of generally parallel, radially outwardly extending legs.

15. A wheel cover as called for in claim 14 wherein said legs are spaced apart circumferentially and connected together at their radially outer ends.

16. A wheel cover as called for in claim 15 wherein said mounting means comprises a plurality of supports fixedly mounted on said cover, said supports having axially extending lugs thereon, the legs of said projections straddling said lugs with a close sliding fit.

17. A wheel cover as called for in claim 1 wherein said mounting means comprises a plurality of supports fixedly mounted on said cover, said supports having radially extending passageways therein, said projections extending through said passageways and beyond the radially outer ends thereof, the circumferentially opposite sides of said passageways defining said radially extending guide surfaces.

18. A wheel cover as called for in claim 1 wherein said ring comprises a single length of wire and said projections are defined by radially outwardly extending U-shaped loops therein.

* * * * *